United States Patent
Toyama et al.

(10) Patent No.: US 7,508,419 B2
(45) Date of Patent: *Mar. 24, 2009

(54) IMAGE EXCHANGE WITH IMAGE ANNOTATION

(75) Inventors: Kentaro Toyama, Redmond, WA (US); David Vronay, Bellevue, WA (US); Padmanabhan Anandan, Sammamish, WA (US)

(73) Assignee: Microsoft, Corp, Redmond, WA (US)

( * ) Notice: Subject to any disclaimer, the term of this patent is extended or adjusted under 35 U.S.C. 154(b) by 153 days.

This patent is subject to a terminal disclaimer.

(21) Appl. No.: 11/251,041

(22) Filed: Oct. 14, 2005

(65) Prior Publication Data

US 2006/0107297 A1    May 18, 2006

Related U.S. Application Data

(63) Continuation of application No. 09/682,755, filed on Oct. 9, 2001, now Pat. No. 7,068,309.

(51) Int. Cl.
*H04N 5/225* (2006.01)
*H04N 5/232* (2006.01)
*H04N 5/76* (2006.01)
*G06F 15/16* (2006.01)
*G06F 17/30* (2006.01)

(52) U.S. Cl. .............. 348/211.3; 348/207.1; 348/231.5; 709/219; 707/3; 725/105

(58) Field of Classification Search ................. 709/212, 709/213, 216, 217, 219, 231, 238, 239; 707/3, 707/6; 348/231.5, 207.1, 211.3, 231.2, 231.3, 348/231.6, 552; 725/105

See application file for complete search history.

(56) References Cited

U.S. PATENT DOCUMENTS

| | | | |
|---|---|---|---|
| 5,760,917 A * | 6/1998 | Sheridan | 358/442 |
| 6,092,080 A * | 7/2000 | Gustman | 707/103 R |
| 6,247,009 B1 * | 6/2001 | Shiiyama et al. | 707/3 |
| 6,301,586 B1 * | 10/2001 | Yang et al. | 707/104.1 |
| 6,366,907 B1 * | 4/2002 | Fanning et al. | 707/3 |
| 6,504,571 B1 * | 1/2003 | Narayanaswami et al. | 348/231.99 |
| 6,573,907 B1 * | 6/2003 | Madrane | 715/719 |
| 6,583,799 B1 * | 6/2003 | Manolis et al. | 715/838 |
| 6,629,100 B2 * | 9/2003 | Morris et al. | 707/10 |
| 6,629,104 B1 * | 9/2003 | Parulski et al. | 707/102 |
| 6,687,878 B1 * | 2/2004 | Eintracht et al. | 715/512 |

(Continued)

OTHER PUBLICATIONS

Kim et al.; "VIRON: An Annotation-Based Video Information Retrieval System"; 1996; IEEE.*

(Continued)

*Primary Examiner*—John M Villecco
(74) *Attorney, Agent, or Firm*—Lyon & Harr, LLP; Katrina A. Lyon

(57) ABSTRACT

A system and method for providing a peer-to-peer photo-sharing environment. The system includes: manual and automatic photo annotation at the client; periodic client-server synchronization; an index of client photos on a central server or a photo database that is resident on the central server, which is updated by the client-server synchronization function; end-user search functionality to search the centralized index or photo database; and transmission of the relevant photos to the client via an on-line image cache. In one embodiment, one client's new photos are automatically displayed on another client's computer (e.g., via screen saver or another mechanism).

19 Claims, 11 Drawing Sheets

U.S. PATENT DOCUMENTS

| | | | |
|---|---|---|---|
| 6,757,684 B2* | 6/2004 | Svendsen et al. | 707/10 |
| 6,804,684 B2* | 10/2004 | Stubler et al. | 707/104.1 |
| 6,813,618 B1* | 11/2004 | Loui et al. | 707/5 |
| 6,954,543 B2* | 10/2005 | Svendsen et al. | 382/102 |
| 7,047,214 B2* | 5/2006 | Wolf | 705/26 |
| 7,124,165 B1* | 10/2006 | Barraclough et al. | 709/204 |
| 7,124,191 B2* | 10/2006 | McIntyre | 709/229 |
| 7,139,018 B2* | 11/2006 | Grosvenor et al. | 348/211.3 |
| 2001/0017668 A1* | 8/2001 | Wilcock et al. | 348/552 |
| 2002/0052885 A1* | 5/2002 | Levy | 707/200 |
| 2002/0075329 A1* | 6/2002 | Prabhu et al. | 345/854 |
| 2002/0093678 A1* | 7/2002 | Skidgel et al. | 358/1.15 |
| 2003/0018802 A1* | 1/2003 | Romanik et al. | 709/234 |
| 2003/0021591 A1* | 1/2003 | Grosvenor et al. | 386/124 |
| 2003/0033296 A1* | 2/2003 | Rothmuller et al. | 707/3 |
| 2003/0078918 A1* | 4/2003 | Souvignier et al. | 707/3 |
| 2003/0154178 A1* | 8/2003 | McIntyre et al. | 707/1 |
| 2004/0201709 A1* | 10/2004 | McIntyre et al. | 348/211.2 |
| 2005/0190273 A1* | 9/2005 | Toyama et al. | 348/231.5 |
| 2005/0280719 A1* | 12/2005 | Kim et al. | 348/231.2 |
| 2006/0087559 A1* | 4/2006 | Huberman et al. | 348/207.1 |
| 2006/0122986 A1* | 6/2006 | Sohma | 707/3 |
| 2006/0168126 A1* | 7/2006 | Costa-Requena et al. | 709/219 |
| 2006/0221190 A1* | 10/2006 | Limberis et al. | 348/207.1 |

OTHER PUBLICATIONS

Benitez et al.; "Using Relevance Feedback in Content-Based Image Metasearch"; Aug. 1998; IEEE Internet Computing.*

IBM Technical Disclosure; "Collaborative Multimedia Annotation using a Centralized Document Server"; Sep. 1, 1995.*

* cited by examiner

IMAGE EXCHANGE WITH IMAGE ANNOTATION

CROSS-REFERENCE TO RELATED APPLICATIONS

"This application is a continuation of a prior application entitled "A SYSTEM AND METHOD FOR EXCHANGING IMAGES" which was assigned Serial Number of prior application Ser. No. 09/682,755 filed Oct. 9, 2001 now U.S. Pat. No. 7,068,309."

BACKGROUND OF THE INVENTION

1. Technical Field

The invention is related to a system and method of providing an image-sharing environment.

2. Background Art

Digital Photo and Video technology promises to enhance our use of photographs and video by making them easy to store, access, and share. (Henceforth, all further references to "photos" or "photographs" should be considered shorthand for "photos and videos.") Recent advances in media management and story telling have helped to deliver on this promise, but much work still remains.

The current model of photo sharing is through the use of online photo sharing websites. To share photographs on these websites, the user uploads copies of their photos to the hosting server, and their friends and family can view them by downloading them to their own computer or by viewing them while still resident on the server.

The current model of photo sharing is undesirable for several reasons. For example, the user already has the photos on their personal computer. Uploading them to a server is a slow and tedious additional step. In addition, many computer users that might like to share photographs are not computer savvy enough to upload them to the server.

As digital cameras become more affordable and digital photographs and images become more popular, more users will want to share photographs. At present, most servers impose a limit on the amount of space a user can use for photo-sharing—typically, around 30 megabytes per user. As more and more users begin to use the available photo-sharing sites, servers will have to cut down on storage allotments to support more users. This problem is compounded by the fact that printers and displays are supporting higher and higher resolution images (and hence much greater sized files), so that each user has a larger number of higher resolution images that they want to share, yet less storage allotment is available for each user to share these photos. As the quality of digital images improves, and greater resolutions and file sizes result, this problem is sure to worsen.

Furthermore, most current photo-sharing systems are server-based, meaning that the images reside in a database on a server. The server model introduces a whole new level of management headache. The user must remember where on their computer their photographs are located to upload them to the server. If the user modifies a photograph-color corrects it, crops it, or removes red-eye—the user must remember to update it both on his local machine and on the photo site. Additionally, other users must be made aware that the photograph has changed. Other users too must know how to get to the site and how to find the modified image once there.

Another issue related to photo sites that allow sharing of photographs on the Internet is that photos are normally thought of as being extremely personal items. People are often hesitant to load their personal pictures up to a large server database, accessible to the entire world. For instance, pictures of one's children or pictures of the inside of one's home are typically held more closely than pictures of famous monuments or pictures of scenery taken on a family vacation. Most people do not want pictures of their children or family posted where they are available to anyone with access to the site.

Another problem associated with the management of photos is related to their indexing, search and retrieval. Consumer research has found that the organization and retrieval of photos and other digital images is a great source of frustration to many users of photo-sharing sites. There are a number of image management products that allow a user to search and retrieve visual information based on annotations associated with images. They allow a user to sort media by name, file type, or folder and browse through files as thumbnails or as textual lists. Some such image management products allow a user to perform key-word searches. They search the images based on keywords entered by the user and retrieve the images based on annotations or 'metadata' associated with each image. Metadata is basically data about data. For example, the title, subject, author, creation date, location, subject and size of a file constitute metadata about that file. The disadvantage with using this keyword scheme for image data retrieval is that it usually means that keywords and textual annotations must be manually entered for each image file. This is very time-consuming and labor-intensive. Additionally, for a search engine to identify an image based on such annotations, much annotation data must be entered for each image to increase the likelihood of obtaining a match between a user-entered keyword and an annotation related to a particular image.

Peer-to-Peer (P2P) is a much better model for sharing photographs and other images. The user can keep their photographs on their own computer, where they already are. Server storage limitations and problems related to updating multiple copies in different stores are resolved. The user can leverage existing "buddy lists" from Instant Messaging software to manage distribution of the photographs to selected circles of friends. A famous P2P file sharing system is Napster, where users exchange audio files over the Internet, each user maintaining their audio files on their own computer. The Napster servers maintain an index of all audio files and associated users that are on-line at a given time. The obvious problem with this P2P approach is that the two peers might not have their machines on at the same time.

For most people, having P2P ready access to a larger number of photos could enable many exciting new scenarios. For example, it could allow pictures of growing children to be automatically sent to a small circle of "photo" friends, conceivably as a screen saver that would automatically appear on these users computers automatically. However, if it were possible to at least potentially have access to a large number of peers, instead of just the small circle of people, the possibilities grow. At first this seems like a useless feature for a photo database. After all, why would someone want to look at the vacation photos from someone they didn't know? It is true that images are taken to capture a specific emotional, social moment. And it is further true that sharing this moment has historically been the primary use of photography. However, photographs also have another property: a photo is taken at a particular moment at a particular location. And this property in itself, when extracted over a large number of photos, can become as important as the emotional context. It can, in fact, be used to enable a broad range of completely new photo capabilities. For instance, if every photograph ever taken was available in a single worldwide database, and could be queried by the date and location where it was taken, many useful scenarios can be envisioned. A traveler planning to go to Rome in February could look at all of the photos taken in Rome in February to determine what the weather is like there that time of year. It could allow people to see pictures of a newsworthy or entertainment event that occurred. It could allow people to locate photos of themselves at a particular place or event. It could allow people to independently verify images in advertisements—such as what a particular hotel looks like.

Therefore, what is needed is a system and method for allowing users to easily share photos with a specific small group of people, a larger group of people, or the whole world. It should overcome the difficulties of loading a user's photos to a server database. It should overcome server storage limitations, and it should ensure that photographs/images throughout the system are updated when one copy of the photograph/image is updated. Furthermore, it should ensure that available photos are easily locatable by all users, and allow transfer of photos even when users desiring to exchange photos are not on-line at the same time. Last but not least, it should allow the user to maintain the desired level of privacy with respect to their photographs/images and limit access to them accordingly. A system and method that encourages user to share a greater number of images would provide for a system that allows photographs and other images to provide more utility than just their social and emotional benefits.

SUMMARY

The system and method according to the present invention solves the problems associated with sharing photographs and other images on-line. It allows a user to easily share images with a specific small group of people, a larger group of people, or the whole world. It allows a user to keep the images on his or her own computer, vice a server, thereby overcoming problems associated with downloading the images to a website. It overcomes server storage limitations, resolves photo management/update issues, and provides for a less labor-intensive image annotation scheme. It also adequately addresses privacy concerns through a sophisticated access design.

The system and method according to the present invention provides for a peer-to-peer photo-sharing environment. The system and method according to the present invention includes: manual and automatic image annotation at the client; a periodic client-server synchronization; an master index of client photographs or images on a central server or a photo database that is resident on the central server, which is updated by the client-server synchronization function; end-user search functionality to search the master index or photo database; and transmission of images from one client to another client. In one embodiment, one client's new photographs are automatically displayed on another client's computer (e.g., via screen saver or another mechanism).

It should be noted that even though the traditional server-client photo-exchange system, where images are hosted on the server, have a multitude of drawbacks as discussed above, even these systems can be improved with many of the novel features of the present invention. Many of these novel features can also be used in a distributed file-sharing system wherein files belonging to one user may be replicated, encrypted, cut up, and stored on any of a number of computers belonging to the same computer network. Distributed file-sharing systems nevertheless present a seamless, transparent file and directory structure to the user such that the underlying mechanisms of file distribution are not explicitly visible to the user.

In general, the system and method according to the present invention includes a central server, one or more clients, and an on-line image/photo cache (Photograph and image will be used here interchangeably, as it should be understood that the present invention applies to all images, including video and other forms of digital imagery, not just digital photographs). These components can be arranged in various configurations.

Each client periodically connects to the Internet or other network hosting the photo-sharing system of the present invention. A local image index (a list of the images on their computer) and an image database are hosted on each client. The client provides images for image-sharing and typically searches a master image/photo index, containing all images available for sharing, for images/photographs that they would like to download.

The central server is on-line on the Internet or on another more localized network. It can host a master index of photographs/images or, alternately, the central server can employ a database of photographs/images that reside on the central server itself. The central server responds to client queries of the master index or database. The central server can store requested images to an on-line photo/image cache. This on-line cache is live on the Internet or other network. Typically, the central server sends images extracted from its master photo database or another client to the photo cache so that a requesting client can download these images. To do this, the server coordinates the transfer of one or more images requested by a client to the on-line photo cache and then coordinates transfer of the image(s) from the on-line photo cache to the client who requested it/them. Storing images to the cache solves two problems. It allows for quicker transfer of the requested images to the requesting client, since popular images can remain cached and cache memory is always faster than main RAM memory. Additionally, use of the cache allows for transfer of images between peers (client to client) even when both clients are not present on the Internet or other network at the same time.

It should be noted that if both clients (the client requesting the image and the client hosting the image) are on-line at the same time the two clients can transfer the image(s) in question directly, without use of the cache. That is, if both clients are on the network or Internet at the same time the transfer can be done P2P, without going through the server. Users can, however, disable the P2P feature on their computers or limit the P2P transfer to user's on their "buddy list", a circle of "photo friends" similar to that found in Instant Messaging applications. If the central server is configured with an image database containing all users images, instead of just a master index, it can also transfer images directly from its database to the requesting client/user, without employing use of the cache.

The invention employs a periodic client-server synchronization schema. The index of client photos that resides on the central server, or the photo database of the central server, is updated by the client-server synchronization function.

The system and method according to the present invention can include manual and automatic photo annotation at the user or client. These annotations are commonly referred to as metadata. This annotation data, or metadata, allows the user to effectively search and control access to the photo index or photo database. The metadata can include: the title, subject, author, creation date and time, location, subject and size of a file, level of privacy associated with the image, modification history, usage statistics (the number of times it was requested, posted, emailed), user rating, any and all user annotations, owner of the metadata and so on. Additionally, the owner of the metadata can be different from the owner of the photo— that is, a different user can control a photo's metadata than the user that hosts the photo on their computer or the user that created the photograph.

Automatic annotations made by the system include the use of face recognition techniques to identify a specific person within the images, automated vision techniques to determine whether an image is natural or man-made, and pixel comparison techniques using images of known type and origin. Additionally, the system and method according to the present invention automatically extracts various parameters of associated with the image, as available, such as creation date and time, location, size of file, and so on. Another automated annotation feature used by system is through the use of image hashing. That is, the system detects multiple images of the same object and combines metadata from the various sources to better annotate each of the images.

The system and method according to the present invention can include access control of images requested by the user or client. This access control is performed by using the metadata to control the search by the requesting client of the index or image/photo database. That is, metadata can be used to make certain images not available to certain users. The access control via metadata can also be made user-specific, governed by a users "buddy list", a circle of users that grant each other access to each others photographs. The user also has some control as to access of his or her images and photographs. They can annotate each photograph with a different level of privacy, e.g., share with no one, share with some, and provide access to everyone. Therefore, the system and method according to the present invention actually limits access in two ways. First by using the users privacy designation, and secondly by simply not searching for metadata when the search criteria are determined to be inaccessible to a particular user, or any user for that matter.

The various system configurations having been discussed above, the primary tasks performed by the system and method according to the present invention include: 1) image annotation; 2) synchronization of the central server with the client(s); 3) search and access and 4) image transfer.

A small photo exchange software application is always running in the background on the client, handled by a shell. This photo exchange application checks for new images being added and old images being taken away at the client. The client maintains its own local database of the images and a local index, and preserves a change log that records the alterations made to the database and the index since the last central server-client synchronization. When new images have been detected at the client, the system prompts the user to annotate them. Many types of metadata are possible. Some types of metadata utilized by the system and method according to the present invention are: 1) the date and time the image was taken; 2) the location on earth where the picture was taken and the orientation of the camera when the picture was taken; 3) the level of privacy associated with the image; 4) the author of the image; 5) modification history; 6) user rating; 7) system imputed location based on time a photo was taken; 8) usage statistics (e.g., how often and when an image was posted; how often an image was emailed, how relevant an image was found to be in a search); 9) any and all user annotations; 10) the owner of the metadata.

All changes to the client's database and index are kept in a change log. Periodically, the client will connect to the central server. When it does, the local database synchronizes with the server's master index. Images are added and subtracted from the server's master index, and metadata is be updated. Note that metadata can come from the server to the client, as well as from the client to the central server. Additionally, all metadata can reside on the central server, or just some portions of the metadata.

In one embodiment of the invention, data on the server is aged. If a user does not synchronize with the server for a long time, the relevance of their images will start to decrease. Eventually, their data will be removed entirely. This feature addresses the issue of one client requesting images from another client that never synchronizes with the central server.

In one embodiment of the present invention the client has four ways of primary ways of searching the database. These are: 1) by user; 2) by space-time; 3) by event; and 4) by key. Where applicable, these searches can be combined. Additionally, automatic keys that use advanced imaging technology, such as "indoor vs. outdoor" and "natural vs. man-made" can be used. To perform the search, the user (via the client) searches the master index or master database in order to search for photos meeting the desired criteria. To do this, the client connects to the central server. The user creates a query of the central server's master index or master database (if such a database is employed in that particular embodiment of the invention). This query is sent to the central server. The central server sends the search results to the client. Each search can return, but is not limited to, in any combination, 1) the metadata of the photo; 2) a thumbnail of the photo; 3) relevancy to the current query; and 4) whether the owner is connected, and if so, at what speed, and if not, when they last connected.

If a user is on another user's photo "buddy list" (similar to that commonly found in instant messaging software), the user can search that user's computer for photographs or images directly. Various photo "buddy lists" can exist for each user, each providing a different level of access to image data.

Once a search is complete, the user can give feedback on the search, indicating which images they thought closes matched their search criteria. This is added to the images' metadata, and used to weight their relevance in future searches. The hope is that over the long-term, a photo that is mislabeled or misannotated will eventually get several low votes, and the image's owner will correct the mislabeling.

If the user wants to get a particular image or photograph from the query result, he requests it from the central server. At the time the request is made, the user can also request a particular size. By default, the photo comes at its natural size. The user request is sent to the central server. The central server then queues the request, and waits for the client that owns the photo to synchronize with it. When a client synchronizes, the central server will instruct it to upload all of its requested images or photographs to the online cache. As each file finishes uploading, the client notifies the central server. The central server then queues a notification to all those clients waiting to receive the image file. When the client requesting the image synchronizes with the central server, the server instructs it to download the image from the cache. If both clients are online at the same time, the transfer can be done P2P, without going through the central server. However, users can disable the P2P feature on their machines, or limit it to people who are on their buddy list.

DESCRIPTION OF THE DRAWINGS

The specific features, aspects, and advantages of the present invention will become better understood with regard to the following description, appended claims and accompanying drawings where:

DETAILED DESCRIPTION OF THE PREFERRED EMBODIMENTS

In the following description of the preferred embodiments of the present invention, reference is made to the accompanying drawings, which form a part hereof, and which is shown by way of illustration of specific embodiments in which the invention may be practiced. It is understood that other embodiments may be utilized and structural changes may be made without departing from the scope of the present invention.

Exemplary Operating Environment

Figure 1:
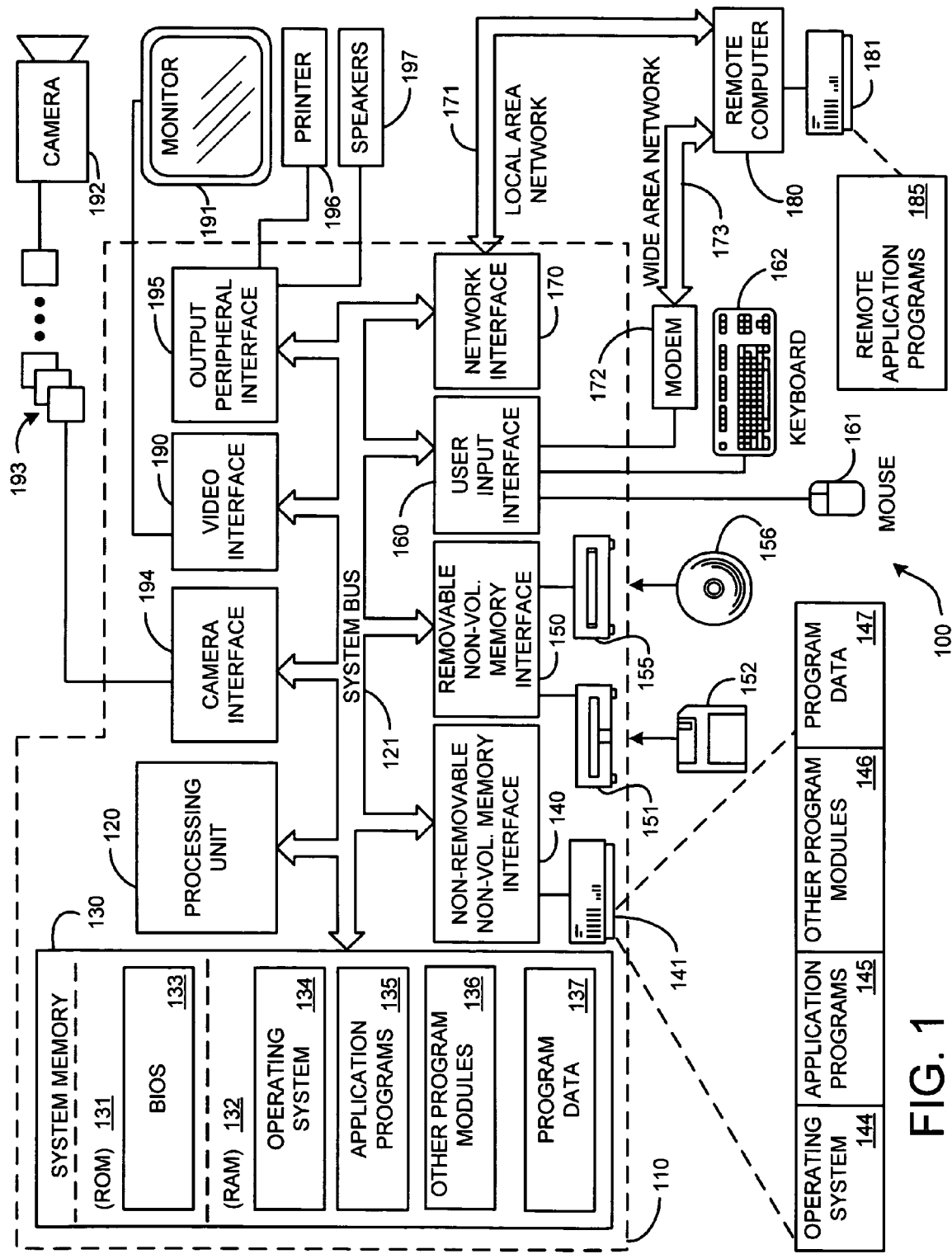
FIG. 1 is a diagram depicting a general purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as an input device to the personal computer 110. The images 193 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

System Overview

The system and method according to the present invention provides for a peer-to-peer photo-sharing environment. However, many novel features of the present invention can be implemented equally well in a traditional server-client configuration.

Figure 2:
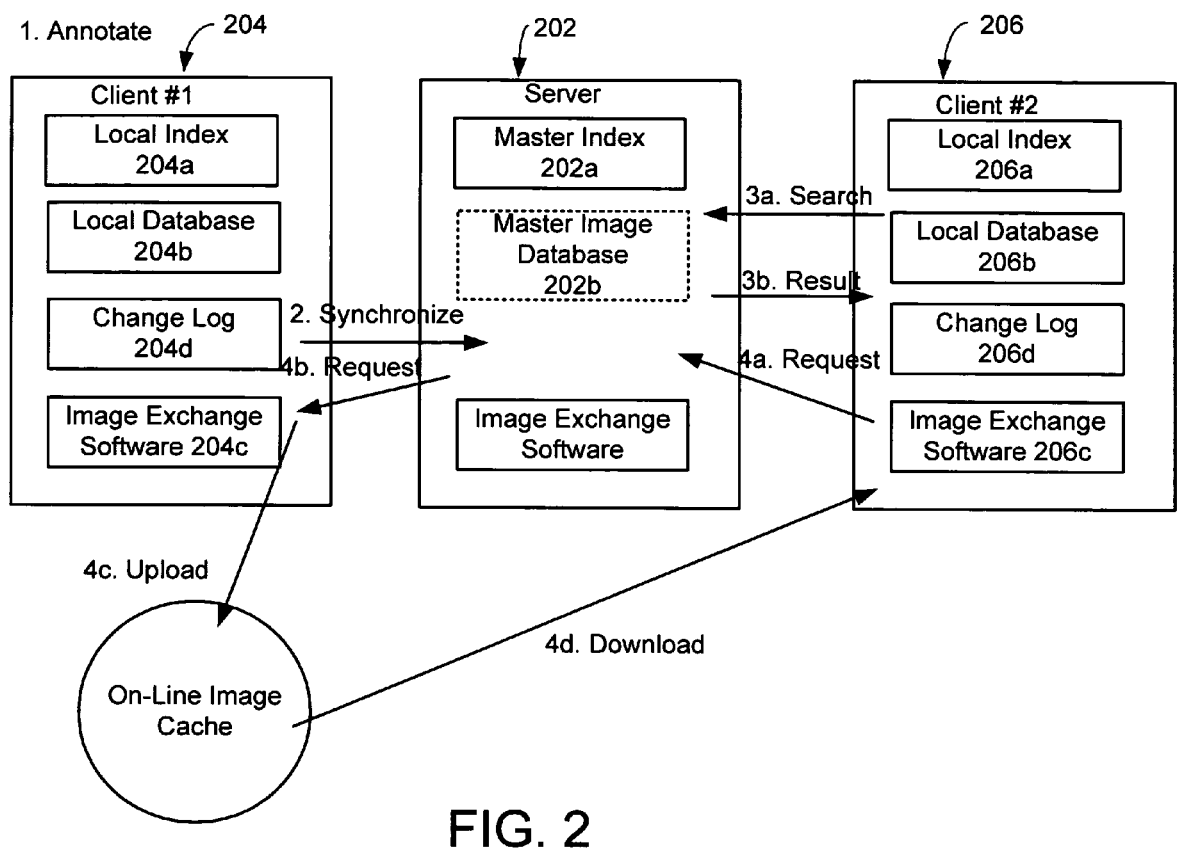
FIG. 2 is a diagram depicting the system configuration for one embodiment of the present invention.

In general, as shown in FIG. 2, the system and method according to the present invention typically includes a central server 202, one or more clients 204, 206, and an on-line image cache 208. However, some of these components may not be necessary in all embodiments of the invention.

Each client 204, 206 periodically connects to the Internet or other network hosting the photo-sharing system of the present invention. Each client has a local image index 204a, 206a (a list of the images on their computer) and an image database 204b, 206b. The client provides images for image-sharing and typically searches a master image/photo index, containing all images available for sharing, for images/photographs that they would like to download.

The central server 202 is on-line on the Internet or on another more localized network. It can host a master index of photos 202a, or, alternately, the central server 202 can employ a database of photos 202b that reside on the server 202 itself. The central server 202 responds to client queries of the index 202a or database 202b and is responsible for coordinating transfer of photographs from a client 204 having a requested photograph (or the server photo database 202b in the embodiment where the photo database resides on the server) to the on-line cache 208 or requesting client 206. The central server 202 can store requested images to the on-line image cache 208. This on-line cache 208 is live on the Internet or other network. Typically, the central server 202 sends images extracted from its master photo database 202b or another client to the photo cache 208 so that a requesting client can download these images. To do this, the server 202 coordinates transfer of one or more images requested by a client 206 to the on-line photo cache 208 and then coordinates transfer of the image(s) from the on-line image cache 208 to the client 206 who requested it/them. Storing images to the cache solves two problems. It allows for quicker transfer of the requested images to the requesting client, since popular images can remain cached and there is no need to search and retrieve them from the client who owns them or from the server's master database if there is one. Additionally, use of the cache allows for transfer of images between peers (client to client) even when both clients are not present on the Internet or other network at the same time.

If both clients 204,206 are on-line, however, these clients 204,206 can coordinate the image transfer directly between them. That is, if both clients 204, 206 are on the network or Internet at the same time the transfer can be done peer-to-peer (P2P), without using the cache 208. Users can disable the P2P feature on their computers, however, or limit the P2P transfer to user's on their "buddy list", a circle of "photo friends" similar to that found in Instant Messaging applications. If the central server 202 is configured with a photo database 202b containing all users images, instead of just a master index 202a, it can also transfer images directly from its database 202b to the requesting client/user 206, without employing use of the cache 208.

The central server 202 can store requested images to the on-line photo/image cache 208. This on-line cache 208 is live on the Internet or other network employed by the system and method according to the present invention. The server 202 either sends images extracted from its database 202b or another client 204 to the photo cache 208 so that a requesting client 206 can download these images.

The invention employs a periodic client-server synchronization schema. The master index 202a of client images that resides on the central server 202, or the image database 202b of the central server 202, is updated by the client-server synchronization function. The end-user (requesting client 206) is provided with search functionality to search this master index 202a or photo database 202b. Once the user locates the desired images the server 202 coordinates the transmission of the relevant photos to the requesting client 206, either from a hosting client 204 to the cache 208 or directly from the server database 202b to the requesting client 206.

The system and method according to the present invention can include manual and automatic photo annotation at the user or client. This annotation data, or metadata, allows the user to effectively search and control access to the photo index or photo database. The owner of the metadata can be different from the owner of the photo—that is, a different user can control a photo's metadata than the user that hosts the photo on their computer or the user that created the photo.

The system and method according to the present invention can include access control of images requested by the user or client. This access control is performed by using the metadata to control the search by the requesting client of the index or image/photo database. That is, metadata can be used to make certain photos not available to certain users. For instance, if a certain user searches by a specific time and location and enters a keyword "young children", the system may bring up pictures related to the time and location in question, but not ones with young children. The access control via metadata can also be made user-specific, governed by a user's "buddy list", a circle of user's that grant each other access to each other's photographs. The user also has some control as to access of his or her images and photographs. For example, the user has an index of their photographs on their computer. They can annotate each photograph with a different level of privacy, e.g., share with no one, share with some, and provide access to everyone. Therefore, the system and method according to the present invention actually limits access in two ways. First by using the user's privacy designation, and secondly by simply not searching for metadata when the search criteria are determined to be inaccessible to a particular user, or any user for that matter.

System Operation

Figure 3:
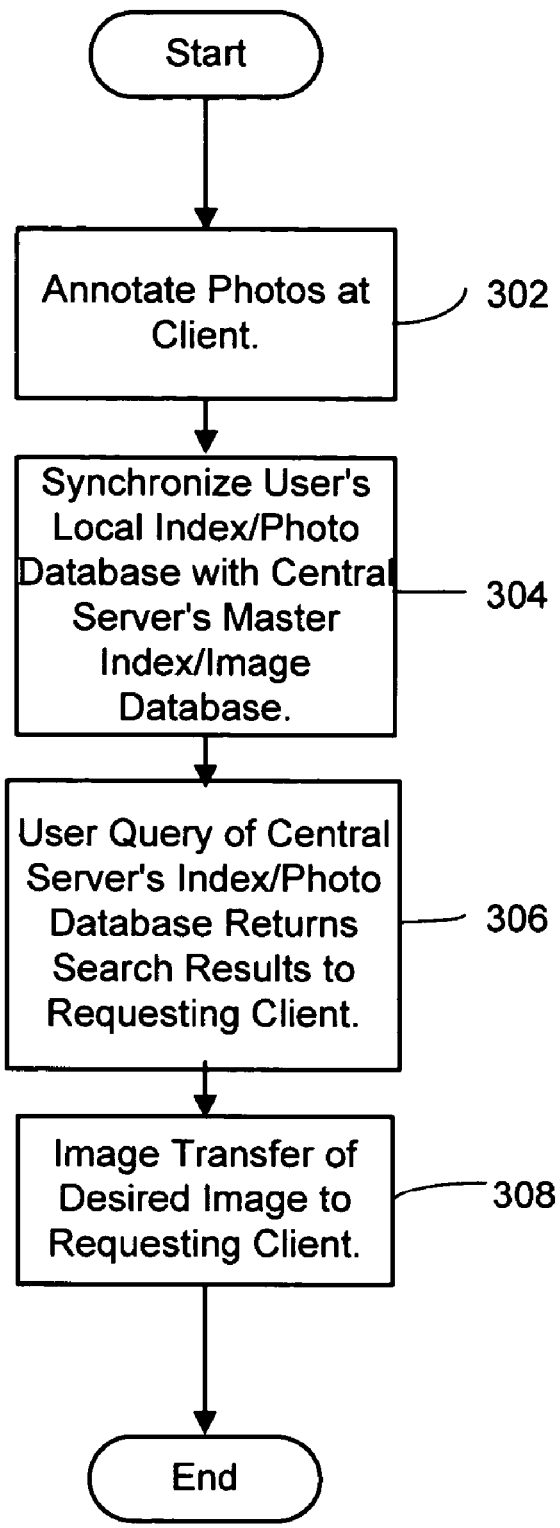
FIG. 3 is a flow diagram depicting the general process actions steps of the system and method according to the present invention.

The various system configurations having been discussed above, the primary tasks performed by the system and method according to the present invention, shown in FIG. 3, include: 1) image annotation (process action 302); 2) synchronization of the central server with the client(s) (process action 304); 3) search and access (process action 306) and 4) image transfer (process action 308). These tasks will be described in more detail in the following paragraphs.

1) Image Annotation

Figure 4:
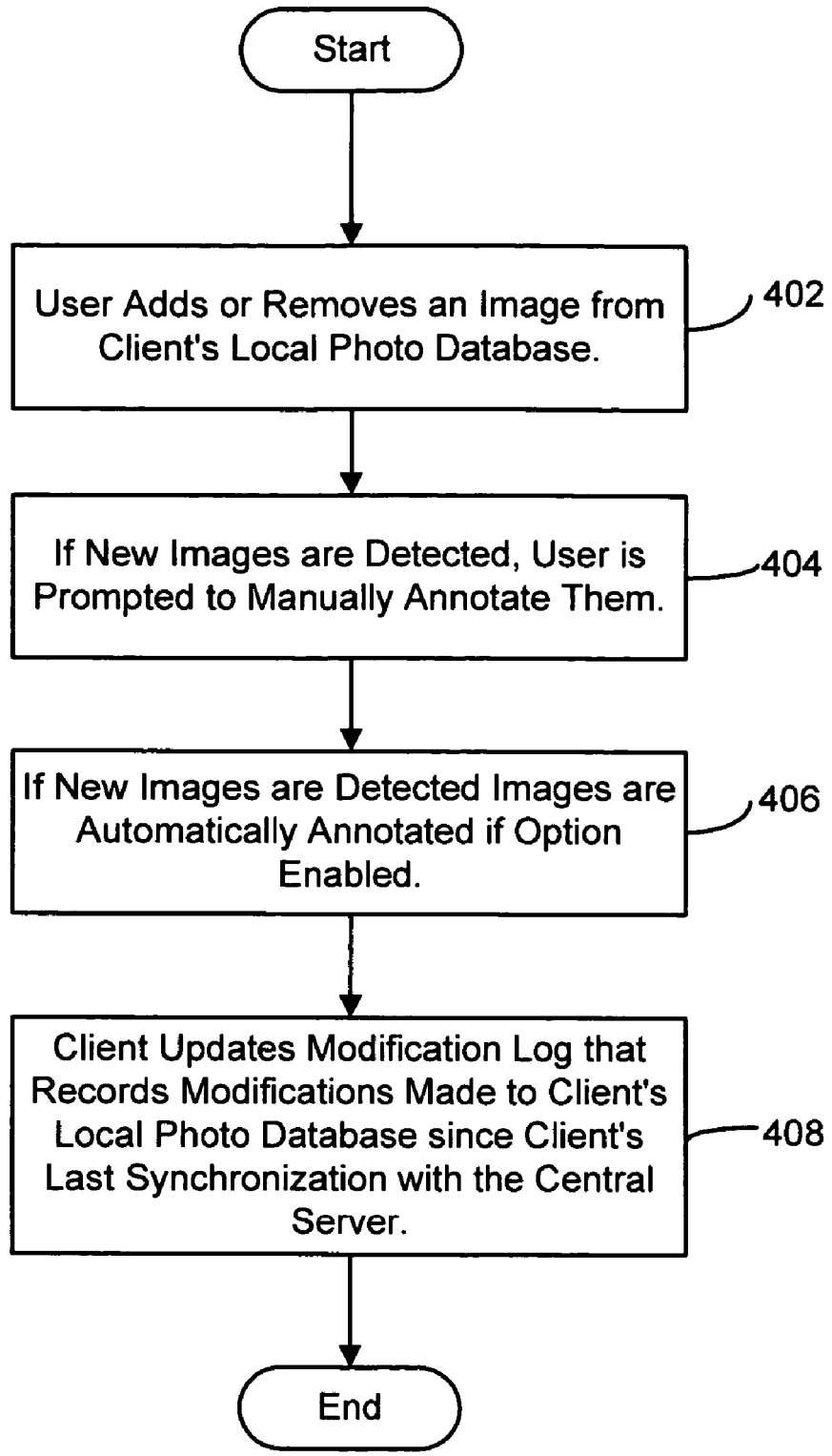
FIG. 4 is a general flow diagram depicting the process action steps performed by the system and method according to the present invention in annotating a client's images.
Figure 5:
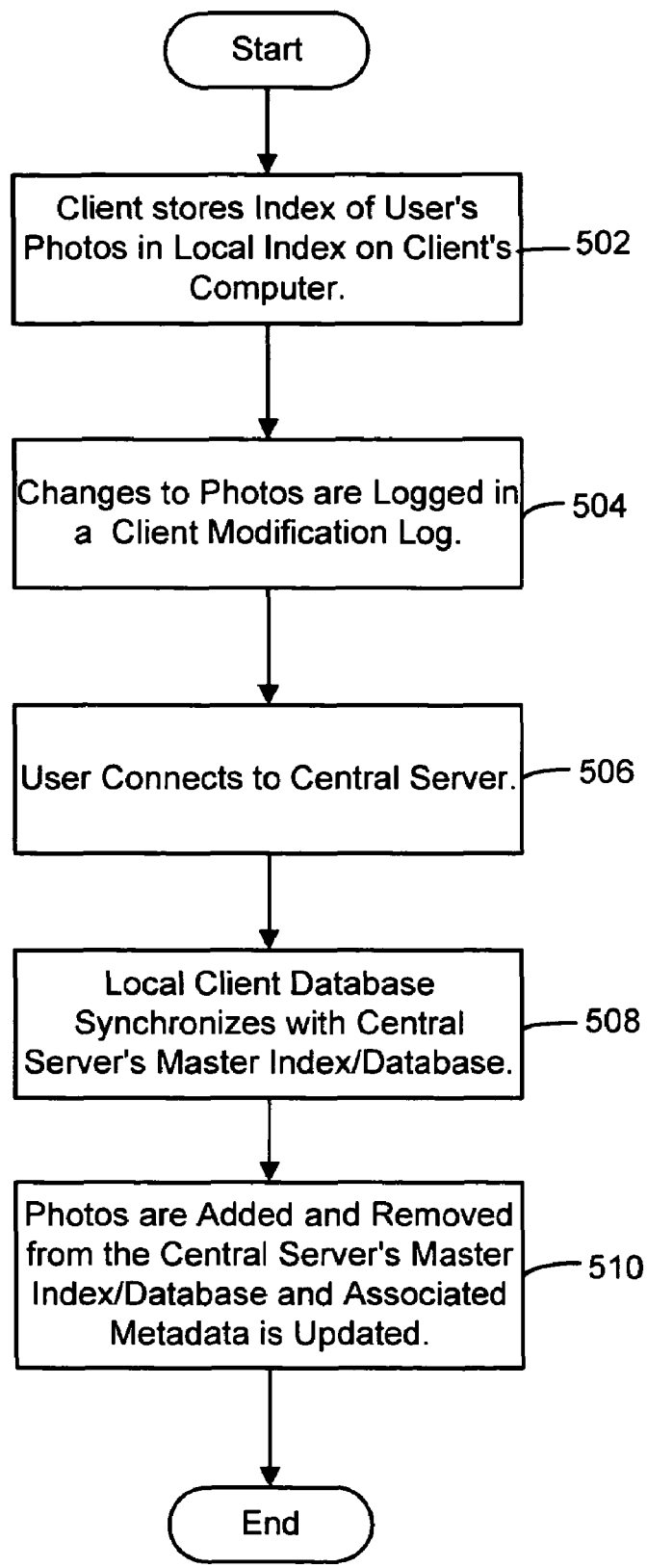
FIG. 5 is a general flow diagram depicting the process action steps performed by the system and method according to the present invention in synchronizing a client's local image/photographic database and index with the central server's master image index/database.

In the system and method according to the present invention a small photo exchange software application is always running in the background on the client, handled by a shell. As shown in FIG. 4 in process action 402, this photo/image exchange application 204c checks for new images being added and old images being taken away at the client. The client maintains its own local database 204b of the images and a local index 204a, and preserves a change log 204d that records the alterations made to the database 204b and the local index 204a since the last central server-client synchronization. When new images have been detected at the client, the system prompts the user to annotate them, as shown in process action 404. These annotations are commonly referred to as metadata. Many types of metadata are possible. Some types of metadata utilized by the system and method according to the present invention are: 1) the date and time the image was taken; 2) the location on earth where the picture was taken; 3) the level of privacy associated with the image; 4) the author of the image; 5) modification history; 6) user rating; 7) system imputed location based on time a photo was taken; 8) usage statistics (e.g., how often and when an image was posted; how often an image was emailed, how relevant an image was found to be in a search); 9) any and all user annotations; 10) the owner of the metadata. These types of metadata are described more fully below.

a) The Date and Time the Image was Taken

Many photographs are annotated with a time stamp when they are taken, as many cameras are now equipped with a time-date tagging feature. Ideally the client's computer time is synchronized to the camera time when the camera is docked and the images are downloaded from the camera to the computer. Additionally, other devices associated with cameras may also provide such a stamp, such cameras integrated with a cellular telephone. This time stamp may be used by the present invention to determine when a given photo was taken. However, this time stamp is not always reliable. For instance, many camera users do not initially set the time and date in the camera. Or the batteries may run out in the camera and the time may be incorrect. Therefore, the system and method according to the present invention provides the capability to override a camera-induced time stamp. For instance, at the time of docking the user's camera with their computer (the client), the user typically has a fairly good sense of when a picture was taken. Hence, one embodiment of the present invention prompts the user to annotate the picture when the camera is docked to the client and the pictures are transferred to the client. The system and method according to the present invention detects common mistakes and offers to correct them.

b) The Location on Earth where the Image was Taken

In order to provide an image database that provides utility the utility of letting the user search images by time and location, identifying the location each image is taken is critical. Ideally, every camera used by the system and method according to the present invention has a Global Positioning System (GPS) unit, a compass, and a method for measuring the pitch and roll of the camera when photographs are taken. The GPS can provide location information in the form of latitude and longitude and is accurate to approximately one meter in non-military applications. The other devices allow measurement of the camera's orientation. Cameras that are integrated with these devices allow for tagging each image with geographic location (geolocation), camera orientation, and a time stamp. However, most camera systems today do not have a GPS built in. Therefore, the system and method according to the present invention has various other methods of obtaining location data. It encourages the user to annotate each picture with geolocation, if a GPS's location/time stamp is not available. The system helps the user be as specific as they can be without encouraging them to be more specific but incorrect. One embodiment of such a user-annotation system takes advantage of place-name-to-geolocation translation applications or services, whereby a user can type or select the text name of a place and the associated geolocation is returned. Alternatively, a user may be presented with a navigable map and asked to place photographs on the map in the approximate location they were taken. Often, time and location information can be used together to impute a location to a photograph. For example, if several photos are known to be close in time and taken with a single camera, and the location of one photograph is known, then a imputed location can be given to the photos created at very close to the same time. Alternately, if the camera used to take the photo is somehow linked with a cell phone, cell site location may also provide an indication of the location where the picture was taken. In short, any form of location information that can be correlated with the time stamp or the content of a photograph can be used to provide geolocation and camera orientation information.

c) Level of Privacy of the Image

Each photograph in the system can be labeled as to its level of privacy. The system and method according to the present invention supports a "buddy list", a list of people the user trusts to view their photos. The system according to the present invention does not expose the owner of photos. Searching based on user name is limited to only those people in the user's buddy list. The system according to the present invention provides the user with the ability to tag some photos as being private. Photos can be private to one person or to the user's entire buddy list. Private photos cannot be seen by others. The present invention supports rules for doing public/private categorization automatically. The level of privacy assigned to each photograph is stored as metadata and set by the user, with one embodiment providing a default setting of completely private (access by the user only) and alternative default setting of completely public (accessible to all). Access to a photograph itself can require a net-aware system such as Microsoft® Passport, which has the capacity to require users to authenticate themselves prior to accessing information available over a network.

d) Image Author

The metadata includes the author of the image.

e) Image Modification History

The modification history of each image is stored on the user's (client's) computer. Such modification history would include when the image was modified, how the image was modified, by whom the image was modified and any corresponding annotations made at the time of modification. This modification history is used by the system to update the central server's index or photo database.

f) User Rating

One field of metadata, the user rating, allows the user to rate each image cited in a search to indicate how accurately it matched their search criteria. This user rating can provide the system with an indication of how closely the annotation of a photograph actually matches the photograph. This data is memorialized, added to the photos' metadata, and is used to weight their relevance in future searches. The hope is that over the long-term, an image that is mislabeled will eventually get several low votes. The low score will then come to the attention of the image's owner, and he will correct it.

g) Usage Statistics:

Another field of metadata, the usage statistics, allows the system to track how a given image has been used. Usage statistics can include, for example, age; how often the image was posted to a website; the times the image was posted to a website; the number of times the image was emailed; how relevant the image was found to be to a particular search; and how many times the image was requested from the server.

h) Owner of the Metadata:

The owner of the metadata is the party that has access rights to make changes to it. The owner of the metadata can be different from the owner of the photograph or image—that is, a different user can control a photograph's metadata than the user that hosts the photograph on their computer, or the user that created the photograph.

The system and method also automatically extracts available data associated with an image as it is available, and annotates the image accordingly (process action 406). Automatic annotations made by the system include the use face recognition techniques to identify a specific person within the images, automated vision techniques to determine whether an image is natural or man-made, and pixel comparison techniques using images of known type and origin. Additionally, the system and method according to the present invention can automatically extract various parameters of associated with the image, as available, such as creation date and time, location, size of file, and so on. Another automated annotation feature used by the system is through the use of image hashing. That is, the system detects multiple images of the same object at various locations throughout the network and elsewhere, and combines metadata from the various sources to better annotate each of the images.

As shown in process action 408 of FIG. 4, once the annotation of a new image is complete the client 204 updates the modification log 204*c* that records modifications made to the client's local image database 204*b* and local index 204*a* since the client's last synchronization with the central server 202.

2) Client-Server Synchronization

As discussed above, and shown in process actions 502 and 504, all changes to the client's database and index are kept in a change or modification log 204*c*. Periodically, the user (client 204) will connect to the central server 202, as shown in process action 506. When they do, their local index 204*a* and/or database 204*b* will synchronize with the master index 202*a* (process action 508). Photos are added and subtracted from the servers master index 202*a*, and metadata is updated, as shown in process action 510. Note that metadata can come from the server to the client, as well as from the client to the central server. For instance, if another client has annotated a copy of an image or photograph owned by a client the mater server can send this annotation data to the client who created the photograph. Additionally, all metadata can reside on the central server, or just some portions of the metadata.

In one embodiment of the invention, data on the server is aged. If a user does not synchronize with the server for a long time, the relevance of their images will start to decrease. Eventually, after a period of, say, two weeks, their data will be removed entirely. This feature addresses the issue of one client requesting images from another client that never synchronizes with the central server.

3) Search

Figure 6:
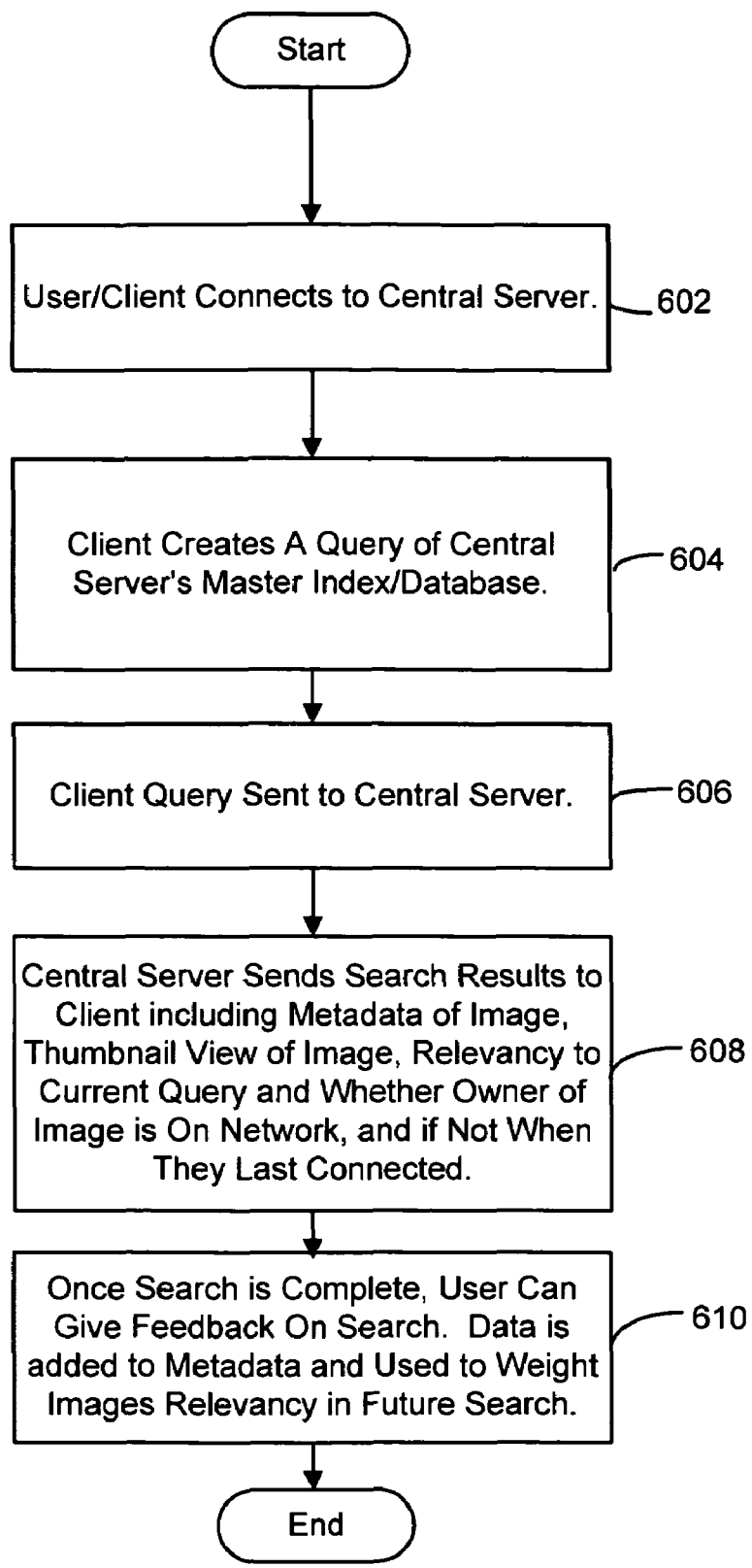
FIG. 6 is a general flow diagram depicting the process action steps performed by the system and method according to the present invention in searching the central server's mater index/database and receiving a search result.

The user (via the client) 206 searches the master index 202a or master database 202b in order to search for photos meeting the desired criteria. To do this, as shown in FIG. 6 in process action 602, the client 206 connects to the central server 202. The user 206 creates a query of the central server's 202 master index 202a or master database 202b (is such a database is employed in that particular embodiment of the invention), as shown in process action 604. The query is sent to the central server 202 (process action 606). The central server 202 sends the search results to the client including (in any combination) the metadata of each image, a thumbnail view of each image, each image's relevancy score to the current query and whether the owner of the image is on the network, and if not when they last connected (process action 608).

In one embodiment of the present invention the client has four ways of primary ways of searching the database. These are: 1) by user; 2) by space-time; 3) by event; and 4) by key. Where applicable, these searches can be combined. Additionally, a search over any of the metadata associated with the photos is also possible. Each search can return, but is not limited to, in any combination: 1) the metadata of the photo; 2) a thumbnail view of the photo; 3) relevancy to the current query; and 4) whether the owner is connected, and if so, at what speed, and if not, when they last connected. The primary methods of searching the database are more fully described below.

a) User Search:

If a user is on another user's photo "buddy list" (similar to that commonly found in instant messaging software), the user can search that user's computer for photographs or images directly. Various photo "buddy lists" can exist for each user, each providing a different level of access to image data. For instance, a user can have a "buddy list" or photo circle that only involves his family and closest friends. He might then annotate photographs of his family and home in his computer as being "closely held" and accessible only to the buddy list that involves his friends and closest family members. He might have another buddy list that involves just his business colleagues. He might then annotate other photographs, such as those of the office Christmas party, on his computer as being accessible only to his co-workers. Some photographs, such as those of he took of monuments and landscape on his last vacation, he may annotate as being accessible to the whole world (e.g., all users of the system and method according to the present invention).

One embodiment of the invention provides the ability to display one client's new photographs automatically on another client's computer (e.g., via screen saver or another mechanism).

b) Space-Time Search

The space-time search works by letting the user select a place on earth at a time frame. However, either location or time can be omitted from the search criteria. All pictures that fall into the requested coordinates and time frame are returned. The query results are returned, ranked by specificity. For instance, a search on Paris will return pictures of the Eiffel Tower above pictures tagged simply as being "in France". Pictures with a GPS tag within Paris are considered more accurate than one that the user just said was in Paris. The search User Interface (UI) allows place names and famous landmarks to be entered simply, but also extends to exact specifications, such as longitude, latitude pairs from a GPS.

c) Event Search

At the simplest level, an event is basically a shortcut for a space-time coordinate. Many "events" are actually a collection of other events. For example, someone might want to see pictures from any concert on a band's tour, even if they do not know the times and locations of the shows. To facilitate this, the master photo exchange database, or a third party event register vendor, will contain a table of events, otherwise known as an event register, that cross-correlates events with location and time. A user can use the event register to find an image of a certain event. Likewise, a user can use an image known to be taken at a certain event to identify the event's time and location. Users can update the event register. Adding events to the table from live news sources is also possible.

d) Key Search

The system and method according to the present invention also supports user-defined key system. For instance, the system supports the user-defined key "picture of me". That is, users can tag any picture in the database as being a picture of them. Additionally, automatic keys that use advanced imaging technology, such as "indoor vs. outdoor" and "natural vs. man-made" can be used.

Keys can be computed and refined on the client machines. For example, a face recognition algorithm may be run over all photos on a client machine, to discover which photos contain Uncle Jim or Aunt Mary. This information could be stored as additional metadata in the central database, or it could be computed on the fly, when such a search is requested.

e) Search Feedback:

Referring again to FIG. 6, process action 610, once a search is complete, the user can give feedback on the search, indicating which images they thought most closely matched their search criteria. This feedback is added to the images' metadata, and used to weight their relevance in future searches. The hope is that over the long-term, a photo that is mislabeled or misannotated will eventually get several low votes, and the image's owner will correct the mislabeling.

4) Image Transfer

Figure 7:
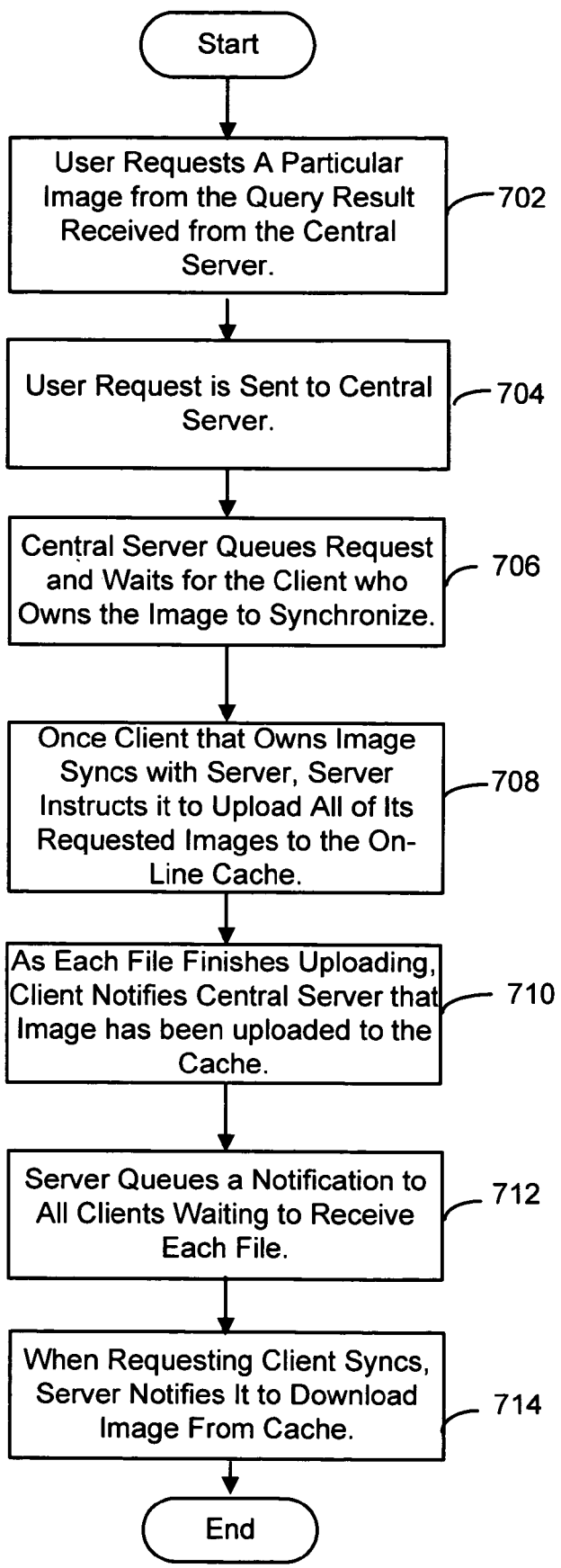
FIG. 7 is a general flow diagram depicting the process action steps performed by the system and method according to one embodiment of the present invention in transferring the desired image to the client.

Referring now to FIG. 7, if the user wants to get a particular image or photograph from the query result, he requests it from the central serve 202 (process actions 702). At the time the request is made, the user can also request a particular size. By default, the photo comes at its natural size. The user request is sent to the central server (process action 704). The central server 202 then queues the request, and waits for the client 204 that owns the photo to synchronize with it (process action 706). As shown in FIG. 7, process action 708, when the client 204 synchronizes with the central server 202, the server 202 will instruct it to upload all of its requested images or photographs to the online cache 208. As each file finishes uploading, the client 204 notifies the central server 202 that the image has been uploaded to the cache 208 (process action 710). The central server 202 then queues a notification to all those clients waiting to receive the image file (process action 712). When the client 206 requesting the image synchronizes with the central server 202, the server 202 instructs it to download the image from the cache 208 (process action 714). If both clients 204, 206 are online at the same time, the transfer can be done P2P, without going through the central server 202. However, users can disable the P2P feature on their machines, or limit it to people who are on their buddy list.

Exemplary Implementations of the System and Method According to the Present Invention The system and method according to the present invention having been described, it should be noted that the various features of the invention can be used in varying combinations and embodiments. Some exemplary implementations of the present invention are discussed in more detail below. These include: 1) an embodiment wherein a master image index, but not a photo database, resides on the server and a cache is used to transfer images; 2) an embodiment wherein a master photo database resides a server, but a cache is not used to transfer images from peer-to-peer; and 3) an embodiment wherein a client directly the searches photo index and photo database of another client that is on the first client's buddy list and both client's are on-line.

Figure 8A:
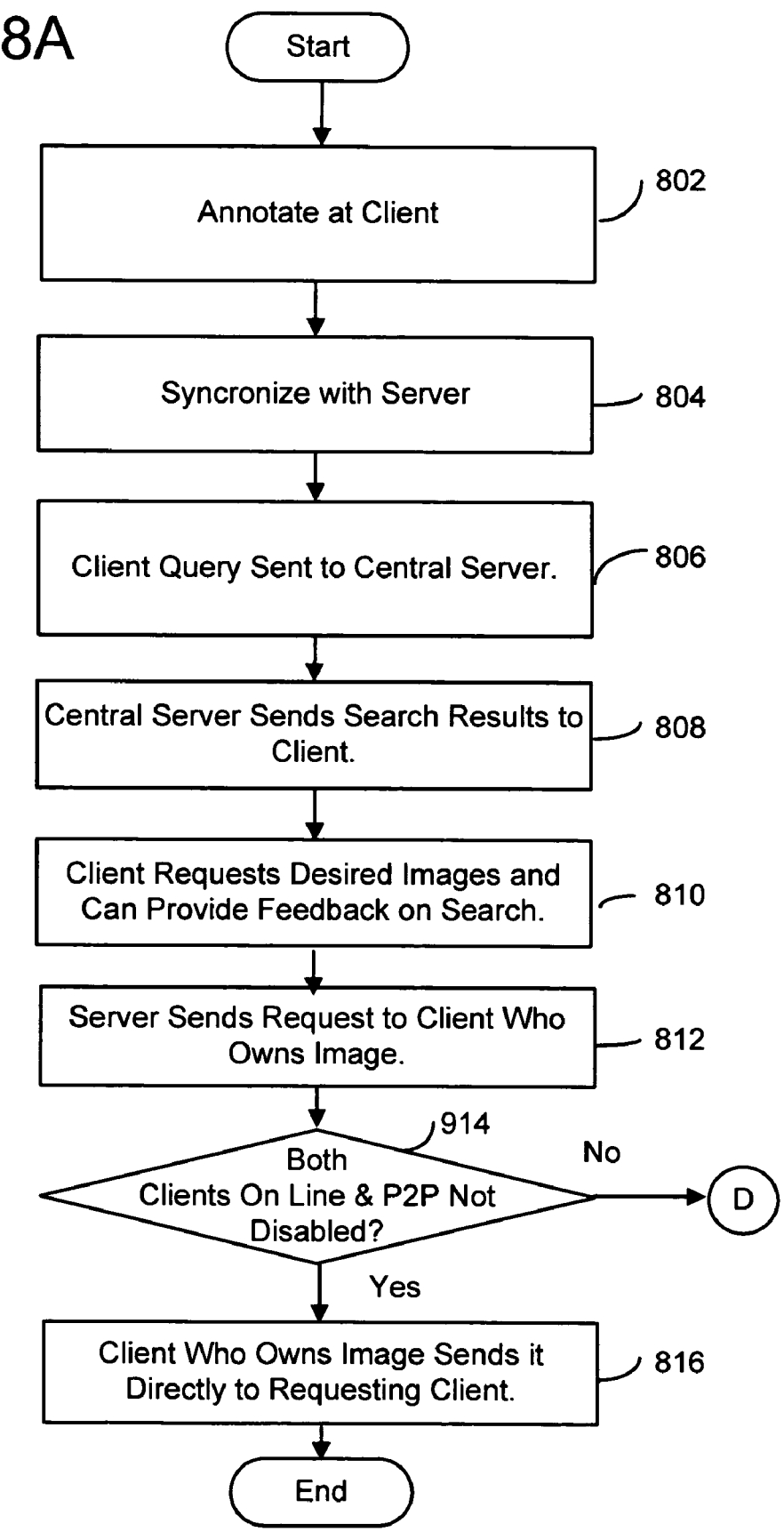
FIG. 8A is a general flow diagram depicting the general process action steps for the embodiment of the system and method according to the present invention employing a master index on a central server and an image cache.
Figure 8B:
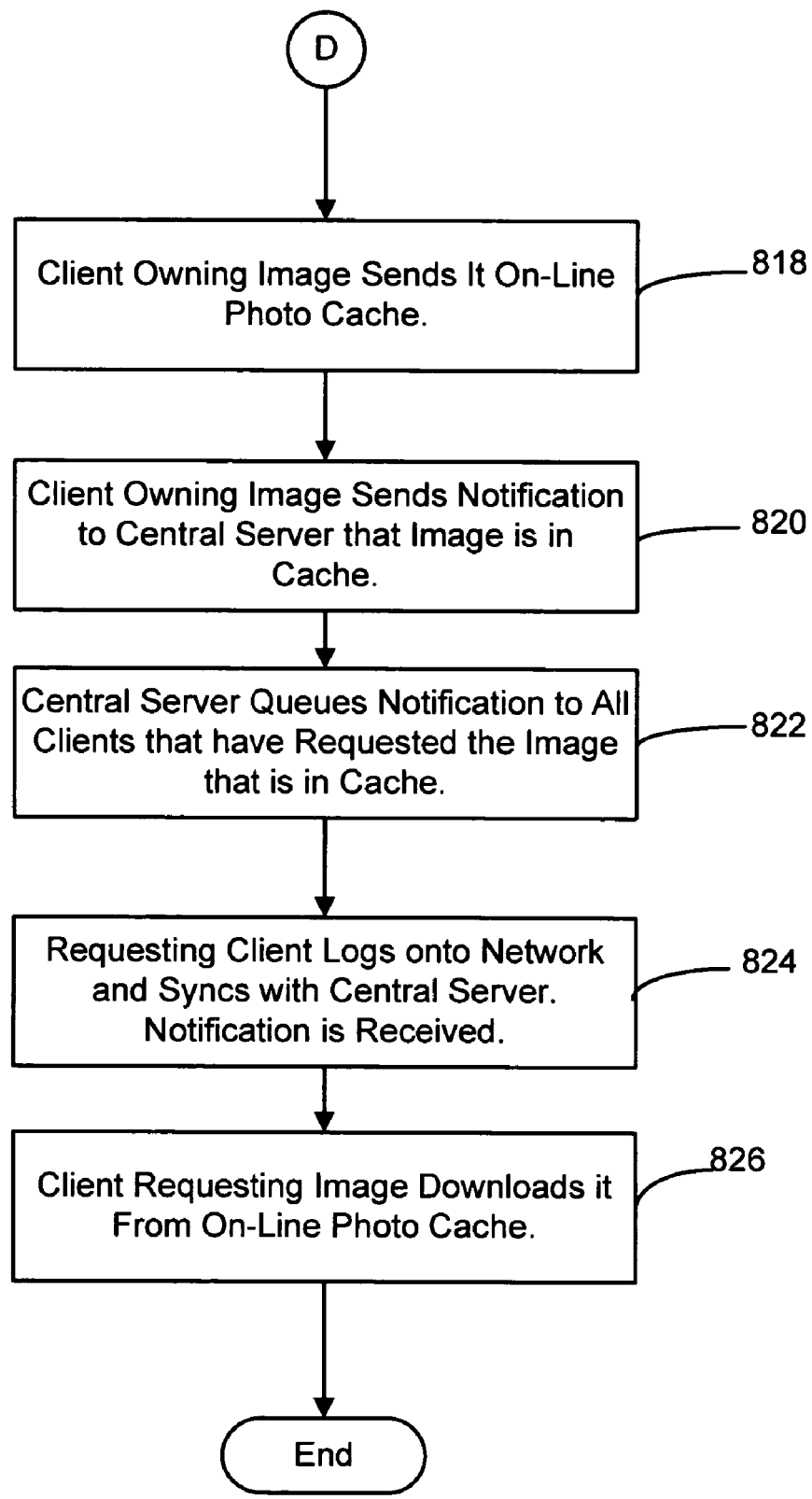
FIG. 8B is a continuation of the flow diagram shown in FIG. 9A.

1) Embodiment wherein a Master Image index, but Not a Photo Database, Resides on a Server, and A Cache is Used to Transfer Images FIGS. 8A and 8B depict a flow chart for an embodiment wherein a master image index, but not a photo database 202b, resides on the central server 202. A cache 208 is used to transfer images peer-to-peer.

In this embodiment, manual and automatic annotations/metadata, as discussed previously, are made at the client 204, 206 whenever images are added or deleted to the client's local database 204b, 206b (process actions 802). A change log 204c, 206c is maintained to memorialize changes to the client's local index 204a, 206a and local image database 204b, 204b. The client periodically synchronizes with the central server 202, as shown in process action 804, and in the synchronization process the server's master index 202a is synchronized with the client's local index 204a, 206a via the modification/change log 204c, 206c, as discussed more fully above. If a client wishes to search the master index 202a, he creates a query, preferably by user, space-time, event or key, or any combination thereof, as discussed previously, and sends it to the central server 202 (process actions 806, 808). The central server 202, searches the master index 202a, and returns search results to the client, as shown in process action 808. Each search can return, but is not limited to, in any combination: the metadata of the photo; a thumbnail view of the photo; relevancy of the image to the current query; and whether the owner is connected, and if so, at what speed, and if not, when they last connected. Access to images returned in the search are again limited by using the user's privacy designation, and by simply not searching for metadata when the search criteria are determined to be inaccessible to a particular user, or any user for that matter. The client then requests the desired images found in the search results and can provide feedback as to images found in the search, as shown in process action 810. The central server 202 then sends a request to the client who owns the desired image (process action 812). If both the requesting client and the client hosting the desired image are both on-line and the requesting client has not disabled P2P transfer or limited it to his buddy list (or the hosting client is on the buddy list), the client that hosts the image can transfer the image directly to the client who requested it (process actions 814, 816). If both the requesting client and the hosting client are not on-line at the same time, or the requesting client has P2P file transfer disabled in general or with respect to the hosting client, the client owning the image sends it to the on-line image cache 208 (process action 818). The client owning the image then informs the central server 202 that the image has been uploaded to the cache 208, as shown in process 820. The central server 202 then queues a notification to all clients that have requested the image that the image has been uploaded to the on-line image cache 208 (process action 822). As shown in process action 824, the next time the requesting client logs into the network and synchronizes with the central server 202, the notification is received. The client requesting the image then downloads it from the on-line cache 208, in a similar manner to that discussed previously.

2) Embodiment Wherein a Photo Database Resides on a Server

Figure 9:
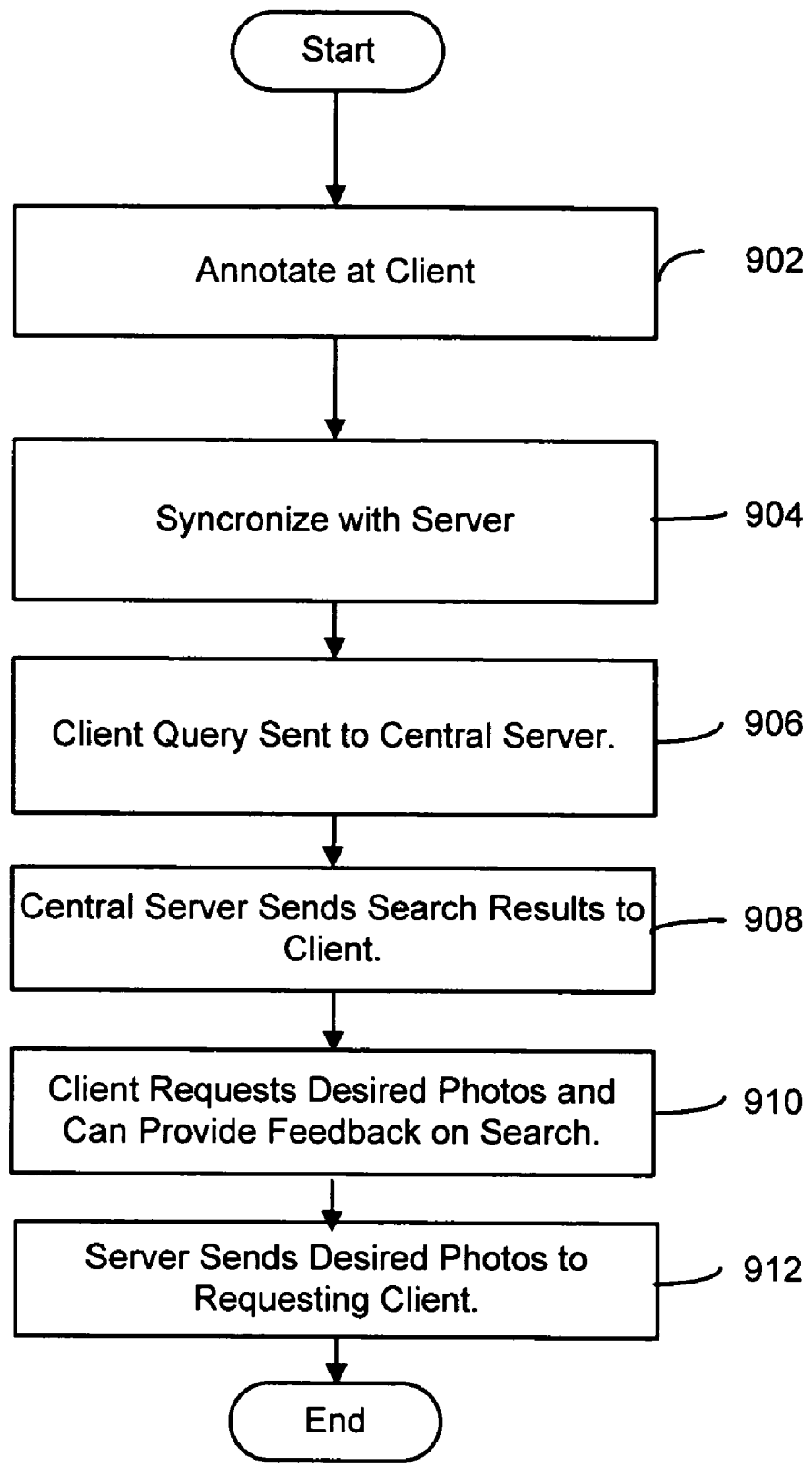
FIG. 9 is a general flow diagram depicting the general process action steps for the embodiment of the system and method according to the present invention employing a client-server configuration, wherein the image database resides on the server.

FIG. 9 depicts a general flow chart for an embodiment wherein a master image index 202a and a photo database 202b, reside on the central server 202. No cache is used to transfer images peer-to-peer.

In this embodiment, manual and automatic annotations/metadata, as discussed previously, are made at the client 204, 206 whenever images are added or deleted to the client's local database 204b, 206b (process actions 902). A change log 204c, 206c is maintained to memorialize changes to the client's local index 204a, 206a and local image database 204b, 204b. The client periodically synchronizes with the central server 202, as shown in process action 904, and in the synchronization process the server's master index 202a and master database 202b is synchronized with the client's local index 204a, 206a and local database 204b, 206b via the modification/change log 204c, 206c. If a client wishes to search the master index 202a, he creates a query, preferably by user, space-time, event or key, or any combination thereof, as discussed previously, and sends it to the central server 202 (process actions 906). The central server 202, searches the master index 202a and master photo database 202b, and returns search results to the client, as shown in process action 908. Each search can return, but is not limited to, in any combination: the metadata of the photo; a thumbnail view of the photo; relevancy of the image to the current query; and whether the owner is connected, and if so, at what speed, and if not, when they last connected. Access to images returned in the search are again limited by using the user's privacy designation, and by simply not searching for metadata when the search criteria are determined to be inaccessible to a particular user, or any user for that matter. The client then requests the desired images found in the search results from the central server 202 and can provide feedback as to images found in the search, as shown in process action 910. The central server 202 then sends the requested image to the requesting client (process action 912).

3) Embodiment Wherein a Client Directly Searches the Photo Index and Photo Database of Another Client that is on the First Client's Buddy List and Both Client's are On-Line.

Figure 10:
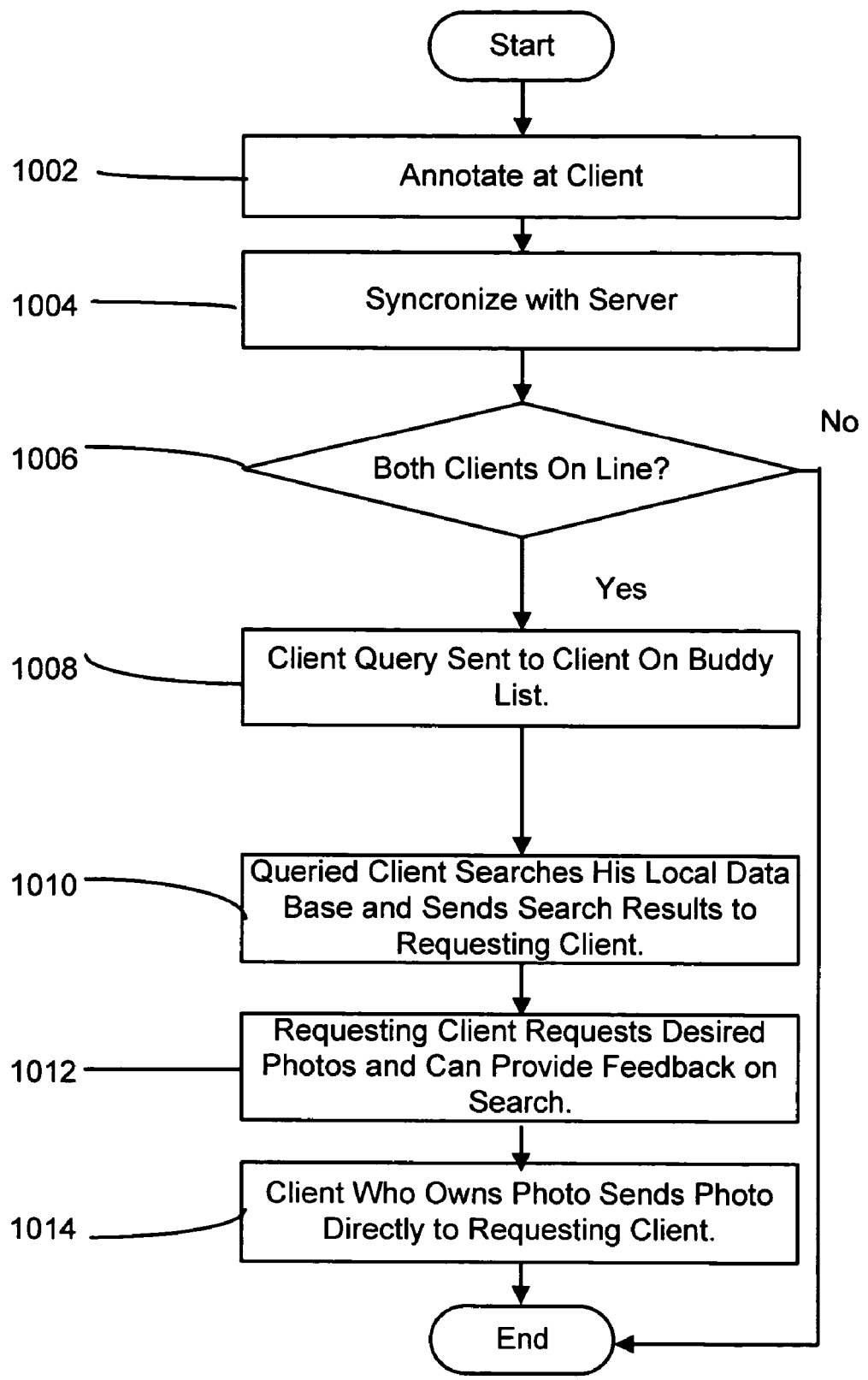
FIG. 10 is a general flow diagram depicting the general process action steps for the embodiment of the system and method according to the present invention wherein clients on the same buddy list search and transfer images directly to each other (peer to peer).

FIG. 10 depicts a flow chart for an embodiment of the present invention wherein a first client is on a second client's buddy list and wherein the first client has access to search the second client's local image index 206a, and photo database 204b. The transfer of the desired images occurs peer-to-peer without use of an on-line cache.

In this embodiment, manual and automatic annotations/metadata, as discussed previously, are made at the client 204, 206 whenever images are added or deleted to the client's local database 204b, 206b (process actions 1002). A change log 204c, 206c is maintained to memorialize changes to the client's local index 204a, 206a and local image database 204b, 204b. The client periodically synchronizes with the central server 202, as shown in process action 1004, and in the synchronization process the server's master index 202a is synchronized with the client's local index 204a, 206a via the modification/change log 204c, 206c, as discussed more fully above (process action 1004). In this synchronization process the option of updating the client's local index with new information on the server's master index can also be available [usage statistics, would be an example of such information]). If a first client 206 is on a second client's 204 buddy list and wishes to search the second client's local index 204a directly, and both clients 204, 206 are on-line at the same time, the first client 206 creates a query of the second client's local index/ local database 204a, 204b and sends it to the second client 204 (process actions 1006, 1008. The second client 204, searches his local index 204a and local database 204b, and returns the search results to the client 206, as shown in process action 1010. Each search can return, but is not limited to, in any combination: the metadata of the photo; a thumbnail view of the photo; relevancy of the image to the current query; and whether the owner is connected, and if so, at what speed, and if not, when they last connected. Access to images returned in the search are again limited by using the user's privacy designation, and by simply not searching for metadata when the search criteria are determined to be inaccessible to a particular user, or any user for that matter. The first client 206 then requests the desired images found in the search results and can provide feedback as to images found in the search, as shown in process action 1012. The second client 206, the one hosting the requested image, then sends the image directly to the client requesting it, as shown in process action 1014.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A computer-implemented process for sharing images among a plurality of clients, comprising the process actions of:
    inputting images at a hosting client;
    annotating said images with metadata at said hosting client;
    creating a local index of said images and local database of said images at said hosting client;
    synchronizing said hosting client's local index with a master index of a central server which automatically retrieves and combines the meta data of an image among said images with meta data associated with the same image from other locations on a network connecting the central server and hosting clients, said master index comprising all images available for sharing at all hosting clients and at said central server; and
    providing images from said hosting client.

2. The computer-implemented process of claim 1 wherein said process action of annotating one of said-images further comprises, annotating said image with a user rating.

3. The computer-implemented process of claim 1 wherein the process action of annotating said images further comprises annotating an image with the time it was created, wherein annotating said image with the time it was created comprises annotating said image with a time by using a time stamp provided by a Global Positioning System integrated with the camera that created the image.

4. The computer-implemented process of claim 1 wherein the process action of annotating said images further comprises annotating said image with the location the image depicts, comprising:
    annotating said image with a location by using a location stamp provided by a Global Positioning System integrated with the camera that created the image.

5. The computer-implemented process of claim 1, wherein the annotating process action is automatic and wherein automatically annotating an image further comprises using automated vision techniques to determine whether the image depicts a natural or man-made object and annotating the image as either natural or man-made.

6. The computer-implemented process of claim 1 wherein the process action of annotating said images further comprises annotating an image with a camera orientation when the image was captured, wherein the camera orientation is provided in the format of yaw, pitch and roll.

7. The computer-implemented process of claim 1 wherein the process action of annotating said images further comprises annotating the privacy level of an image, wherein annotating the privacy level of the image comprises the process action of annotating said image with a privacy level that is manually input by the user.

8. The computer-implemented process of claim 7 wherein the privacy level that is manually input by a user further comprises the process action of selecting from a default setting of having the image accessible to only the user.

9. The computer-implemented process of claim 1, wherein the annotating process action is automatic and wherein automatically annotating an image further comprises using pixel comparison techniques with images of known content and comparing the image to determine its content and annotating the image as to what the image is.

10. The computer-implemented process of claim 1 wherein the process action of annotating said images further comprises annotating the image with an image modification history that comprises:
    annotating said image with annotation data as to how it was modified;
    annotating said image with annotation data as to when it was modified;
    annotating said image with annotation data as to by whom it was modified; and
    annotating said image with any other modifications made to annotation data made at the time of modification.

11. The computer-implemented process of claim 1 wherein the process action of annotating said images further comprises annotating the image with a server-provided user rating comprising an indication as to how closely the image matched a search criteria.

12. The computer-implemented process of claim 1, wherein the annotating process action is automatic and wherein automatically annotating an image further comprises using face recognition techniques to identify a specific person in the image and annotating the image with an identifier for the person.

13. The computer-implemented process of claim 1 wherein the process action of annotating said images further comprises annotating said image with usage statistics comprising:
    annotating the image with how often the image was posted to a website;
    annotating the image with the times the image was posted to a website;
    annotating the image with the number of times the image was emailed;

annotating the image with how relevant the image was found to be in a search; and annotating the image as to how many times the image was requested.

14. The computer-implemented process of claim 1, wherein the process action of annotating at least one of said input images further comprises annotating the image with an imputed location based on time and location the image was taken further comprising the process actions of:

identifying the time and location said image was created;

identifying other images taken close to the same time and with the same camera when said image was created;

imputing to said image the location of said other images taken at close to the same time; and annotating said image with said imputed location.

15. The computer-implemented process of claim 1 wherein the process action of synchronizing further comprises the process actions of:

storing changes to local index and local database of said images at said hosting client in a modification log;

periodically connecting said hosting client to said central server; and synchronizing said local index and said local database of said hosting client with said master index of said central server using said modification log.

16. A computer-implemented process for sharing images comprising the process actions of:

inputting images at a hosting client;

automatically retrieving from other locations on the network and annotating said images with metadata associated with the same image located in a different location at said hosting client;

at said hosting client creating a master index of all images available for sharing at all hosting clients and at said central server;

creating a local index of images input at the hosting client and a local database wherein the images include the meta data associated with the same image located at a different location of said images at said hosting client;

providing images from said hosting client.

17. The computer-implemented process of claim 16 wherein said process action of annotating said input image further comprises, annotating said image with usage statistics.

18. The computer-implemented process of claim 16 further comprising annotating an image with a location which the image depicts, wherein annotating said image with the location which the image depicts comprises annotating said image with a location by using a location stamp provided by deriving a location from cell site location provided by a camera integrated with the camera that created the image.

19. The computer-implemented process of claim 16, further comprising annotating an image with an imputed location, wherein the process action of annotating the image with an imputed location further comprises the process actions of:

identifying the time and location said image was created;

identifying other images taken close to the same time and with the same camera when said image was created;

imputing to said image the location of said other images taken at close to the same time with a same camera; and annotating said image with said imputed location.

* * * * *